E. F. W. ALEXANDERSON.
POWER TRANSMITTING MECHANISM.
APPLICATION FILED AUG. 7, 1916.
1,223,924.
Patented Apr. 24, 1917.
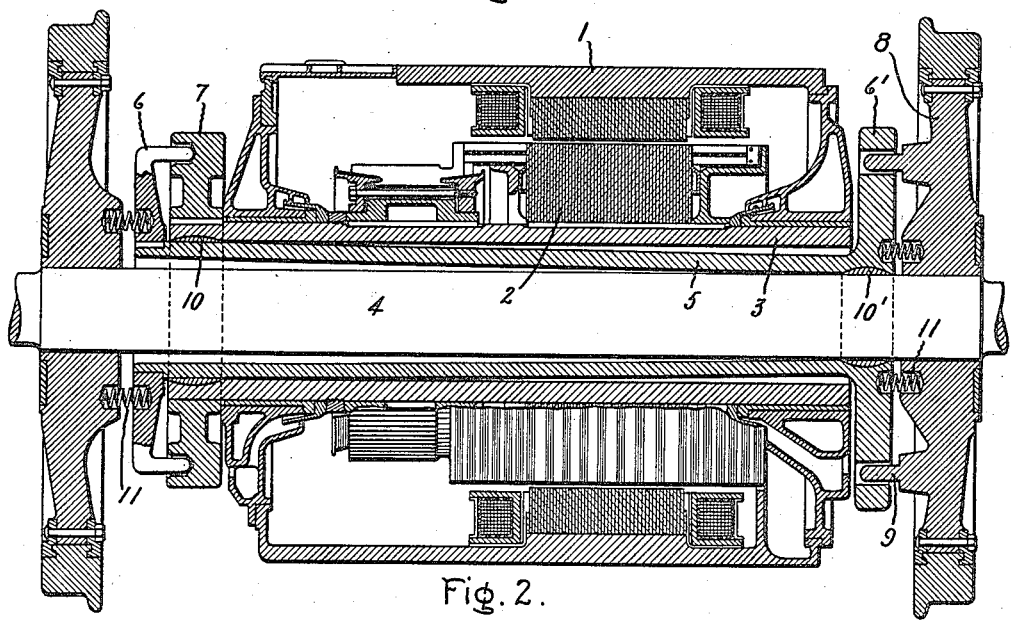
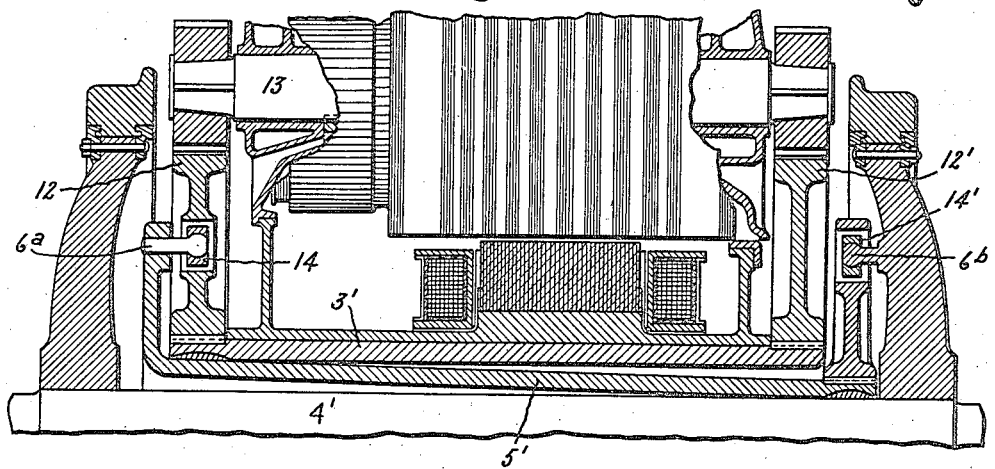
Inventor:
Ernst F. W. Alexanderson,
by
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

POWER-TRANSMITTING MECHANISM.

1,223,924.

Specification of Letters Patent.

Patented Apr. 24, 1917.

Application filed August 7, 1916. Serial No. 113,482.

*To all whom it may concern:*

Be it known that I, ERNST F. W. ALEXANDERSON, a citizen of the United States, residing at Schenectady, in the county of Schenectady, State of New York, have invented certain new and useful Improvements in Power - Transmitting Mechanism, of which the following is a specification.

This invention relates to an improved power transmitting mechanism especially adapted for motor propelled vehicles and herein specifically described and illustrated in connection with a railway motor. The purpose of the invention is to provide improved means for suspending the motor and for connecting the motor shaft to the car wheel axle, in such a manner as to efficiently transmit power from the one to the other and at the same time protect the motor from shocks caused by irregularities of the wheels or road bed.

In high speed locomotives it has long been considered desirable to spring-suspend the motor and transmit the power to the driving wheels through a flexible member. This has heretofore been accomplished by means of side-rods and also by means of spring clutches incorporated between the motor and the wheels. The spring-clutch arrangement while accomplishing its purpose has a disadvantage in that the springs break and must be renewed frequently.

In carrying out my invention, which overcomes such disadvantages and accomplishes the desired end, I provide a relatively large hollow driving shaft through which the wheel axle extends, power being transmitted from the driving shaft to the wheel axle by means of a driving member, preferably in the form of a sleeve, located between the shaft and axle, and having driving connection at one end with the hollow shaft and at the other end with the wheel axle. These parts are so proportioned as to permit of tilting of the wheel axle without affecting the motor.

The invention will be more clearly understood by reference to the accompanying drawing, in which Figure 1 illustrates the invention as embodied in a gearless motor whose hollow armature-shaft is mounted directly upon the wheel axle, and Fig. 2 illustrates the invention as applied to a geared motor in which case the hollow shaft, mounted on the wheel axle, is geared to the motor shaft.

Referring to Fig. 1 of the drawing, the motor comprises the stationary frame 1 and the revolving member 2 which is provided with a hollow shaft 3 surrounding the wheel axle 4, the axle 4 being relatively smaller in diameter than the shaft 3. Between the hollow shaft 3 and the axle 4 extends the tapering sleeve 5 provided at its two ends with clutch members 6 and 6', which engage on the one end, the clutch member 7 mounted on the hollow motor-shaft, and on the other end with the driving wheel 8, which is provided with coöperating clutch members 9. In order to permit of eccentric movement of the sleeve 5 with reference to either of the two shafts, and at the same time maintain the clutch members in concentric relation, ball-joints 10 and 10' are provided between the sleeve and shafts at opposite ends, adjacent the clutch members. The motor should be so mounted as to permit of slight lateral movement with relation to the wheel, so that the mass of the motor will not be able to strike a direct blow against the wheels. For this reason the ball joint 10' between the sleeve 5 and the axle 4 is provided with a cylindrical sliding fit, and springs 11, arranged to take the thrust, are placed between the clutch members and the car wheels in pockets provided for that purpose.

It should be understood that the arrangement of the ball-joints 10 and 10' between the driving sleeve 5 and the two shafts is only illustrative of one of many possible arrangements for maintaining the engaging clutch members concentric; these may, in fact, be omitted altogether, if the clutch-members are so machined as to maintain themselves in concentric relation.

In Fig. 2 of the drawing, in which the invention is shown as applied to a geared motor, the hollow shaft 3' and tapering sleeve 5' surround the wheel axle 4' as in the arrangement shown in Fig. 1, but in this case the hollow shaft is driven through gearing 12 and 12' from the motor shaft 13; the gearing 12 at the left hand end corresponds to clutch member 7 of Fig. 1, but is provided with gear teeth.

A modified construction of the clutch members is illustrated in Fig. 2; in this arrangement the prongs 6ª and 6ᵇ of the clutches fit into holes in intermediate members 14 and 14' which may be a block sliding between two flat surfaces.

I have illustrated and described my invention in what I now consider the preferred embodiment thereof, but the details of construction and arrangement of parts may be varied in many ways without departing from the spirit of my invention, the scope of which is set forth in the appended claims.

What I claim as new and desire to secure by Letters Patent of the United States, is:

1. In combination, a driving shaft and a driven shaft, one of which is hollow, the other being of relatively smaller diameter and extending through said hollow shaft, and a power transmitting member extending between said shafts and normally concentric therewith but capable of eccentric movement relative to either of said shafts, said power transmitting member having driving connection with each of said shafts at opposite ends thereof.

2. In combination, a driving shaft and a driven shaft, one of which is hollow, the other being of relatively smaller diameter and extending through said hollow shaft, a clutch member on each side of said shafts at opposite ends thereof, and a power transmitting member extending between said shafts and provided with a clutch member at each end which clutch members engage the clutch members on the two shafts, said power transmitting member being normally concentric with both of said shafts but capable of eccentric movement relative to either of the shafts.

3. In combination, a driving shaft and a driven shaft, one of which is hollow, the second shaft being of relatively smaller diameter and extending through said hollow shaft, a clutch member on each of said shafts at opposite ends thereof, a power transmitting member extending between said shafts and provided with a clutch member at each end which clutch members engage the clutch members on the two shafts, and means for maintaining the engaging clutch members in concentric relation while permitting of relative eccentric movement between the said shafts.

4. In combination, a driving shaft and a driven shaft, one of which is hollow, the second shaft being of relatively smaller diameter and extending through said hollow shaft, a clutch member on each of said shafts and at opposite ends thereof, a power transmitting sleeve intermediate said shafts, a clutch member on each end of said sleeve which clutch members freely engage the clutch members on the two shafts, the power transmitting sleeve having ball and socket connection with each of said shafts adjacent the respective clutch members, the arrangement being such as to permit of relative eccentric movement between said shafts while maintaining the clutch members on the sleeve in concentric relation with the clutch members on the two shafts.

5. In combination, in a motor drive, a motor comprising a stationary member and a rotating member provided with a hollow shaft, a driven shaft of relatively smaller diameter extending through said hollow shaft, and a power transmitting member located between said shafts and having driving connections with each of said shafts at opposite ends thereof, the parts being so proportioned and arranged as to permit of relative eccentric movement between the shafts.

6. In combination, in a motor drive, a motor comprising a stationary member and a rotating member provided with a hollow shaft, a driven shaft of relatively smaller diameter extending through said hollow shaft, a clutch member on each of said shafts at opposite ends thereof, and a power transmitting member extending between said shafts and provided with a clutch member at each end which clutch members engage the clutch members on the two shafts, said power transmitting member being normally concentric with both of said shafts but capable of eccentric movement relative to either of the shafts.

7. In combination, in a motor drive, a motor comprising a stationary member and a rotating member provided with a hollow shaft, a driven shaft of relatively smaller diameter, extending through said hollow shaft, a clutch member on each of said shafts at opposite ends thereof, a power transmitting member extending between said shafts and provided with a clutch member at each end which clutch members engage the clutch members on the two shafts, and means for maintaining the engaging clutch members in concentric relation while permitting of relative eccentric movement between the said shafts.

8. In combination, in a motor drive, a motor comprising a stationary member and a rotating member provided with a hollow shaft, a driven shaft of relatively smaller diameter extending through said hollow shaft, a clutch member on each of said shafts at opposite ends thereof, a power transmitting sleeve extending between said shafts and provided with a clutch member at each end which clutch members engage the clutch members on the two shafts, and a universal joint between the power transmitting sleeve and each shaft adjacent the respective clutch members.

In witness whereof, I have hereunto set my hand this 5th day of August 1916.

ERNST F. W. ALEXANDERSON.